Dec. 27, 1955 H. BECKER ET AL 2,728,222
APPARATUS FOR MEASURING SURFACE IRREGULARITIES
Filed Oct. 9, 1951 2 Sheets-Sheet 1

Helmut Becker
Gwald Bender
Ludwig Bergmann
Karlheinz Port
Alfred Gobel
INVENTORS BY Benj. T. Rauber
their attorney

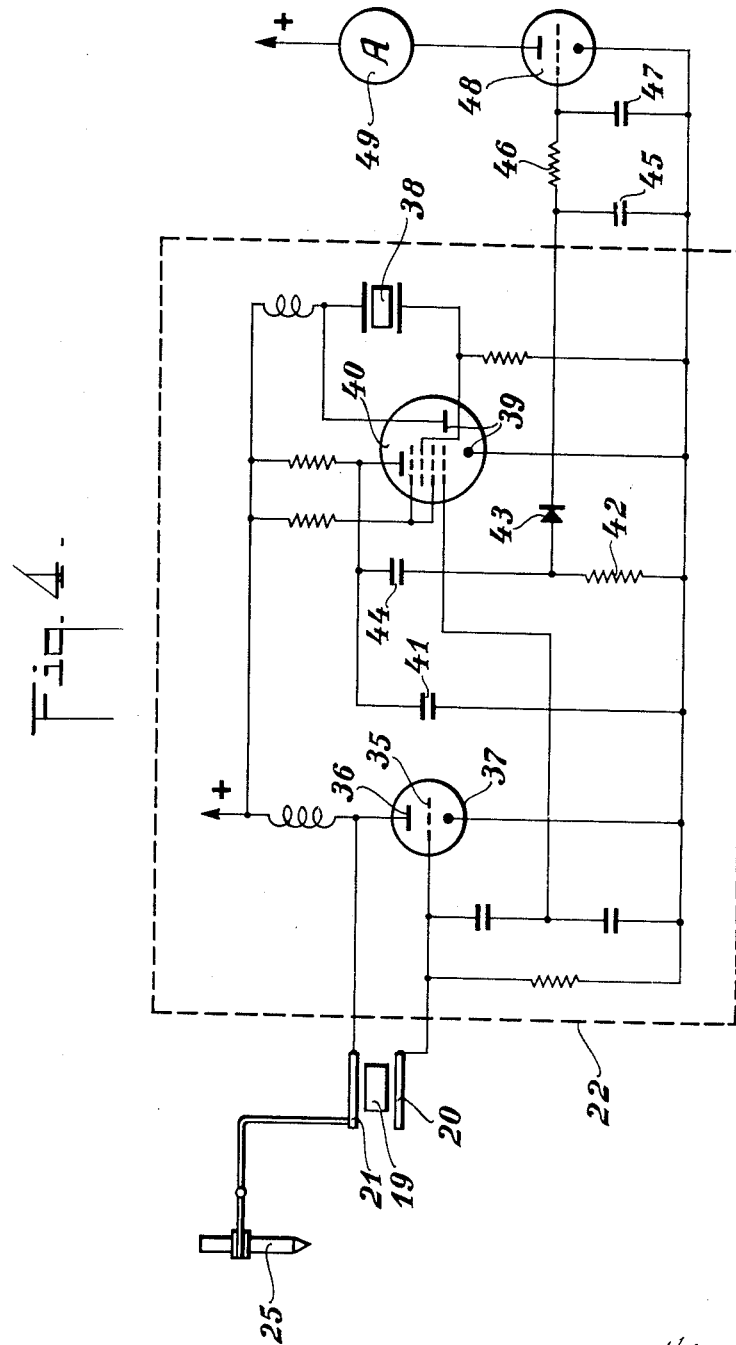

United States Patent Office 2,728,222
Patented Dec. 27, 1955

2,728,222
APPARATUS FOR MEASURING SURFACE IRREGULARITIES

Helmut Becker, Wetzlar, Oswald Bender, Bad Homburg vor der Hohe, Ludwig Bergmann, Wetzlar, and Karlheinz Rost and Alfred Zobel, Bad Homburg vor der Hohe, Germany, assignors to Ernst Leitz, G. m. b. H., Wetzlar, Germany, a corporation of Germany Application October 9, 1951, Serial No. 250,526

Claims priority, application Germany October 17, 1950

15 Claims. (Cl. 73—105)

Our invention relates to an apparatus for testing the mechanical condition, such as the roughness and waviness, of surfaces.

In testing apparatus of this type heretofore known the surface to be tested has been tested by a probe whose variations of movement normal to the surface being examined were evaluated as a measure of the surface condition. This evaluation could be followed optically by a mirror arrangement which deflects a light beam corresponding to the variation in the path of the testing probe. The light beam was accordingly used to illuminate a film, from which, after development, there then appeared a picture which corresponded to the condition of the surface. In order to prevent the springing of the testing probe in proceeding over the bumps and hollows of the test surface, the test probe in such surface testing apparatus was subjected to an up and down movement in which the surface condition agreed with an increase or decrease in the amplitude of movement.

Another known method of evaluating the variation in movement of the testing probe comprised the transformation of the path variations into electric energy oscillations which could then be brought to an indicator or record. By an arrangement of this latter type, one has however been limited to direct the testing probe loosely to and fro over the test surface so that the test results are false because of the springing of the test probe on the surface. Particularly, records of such measuring results showed different pictures for forward movement than for return movements. On the other hand such equipment, on such an electric basis, is distinguished by the advantage that the test results were observable directly on an electric indicating instrument and could be recorded without photographic development.

Our invention is directed to the problem of so applying electrical methods, with their inherent advantages, that a test fidelity will be attained which is at least equal to the optical surface testing equipment. In accordance with the invention this is attained in such manner that the test probe is held in its path over the test surface in periodic fundamental or resonant oscillations and that the variations of the electric energy, released directly or indirectly, compared with a normal value for an ideal surface, is brought to an indicator.

To this purpose the equipment may be equipped with a system of at least one piezoelectric crystal solely generating the oscillations of the test probe coupled with at least one piezoelectric crystal generating the test current. Apparatus according to the invention may however be constructed in such manner that the test probe is coupled with a movable branch which changes the fundamental frequency of a piezoelectric oscillating crystal system in an electric crystal oscillator circuit either capacitatively as electrode or inductively as an induction control branch to an electric resonant circuit. Thereby the frequency alteration thus released is brought to the indicator as a measure of the mechanical condition of the test surface. According to the invention an integrating measuring instrument can be used as a recording apparatus which shows the sum of all individual deviations. If maximum values are to be shown an electric measuring instrument may, in accordance with the invention, be provided with one adjustable graduation opposite the test pointer and two drag pointers enclosing the test pointer between them. If the test results are to be recorded, the electric indicating energy, with test values in the form of current or potential variations, as the case may be, may be supplied after previous amplification over a rectifier to a recording indicating apparatus, which indicates the effective values of the rectified electric energy. With the testing of these frequency variations, they can be registered on a corresponding test equipment.

The features of this invention are illustrated diagrammatically, by way of example, in the accompanying drawing, in which.

Figure 1:
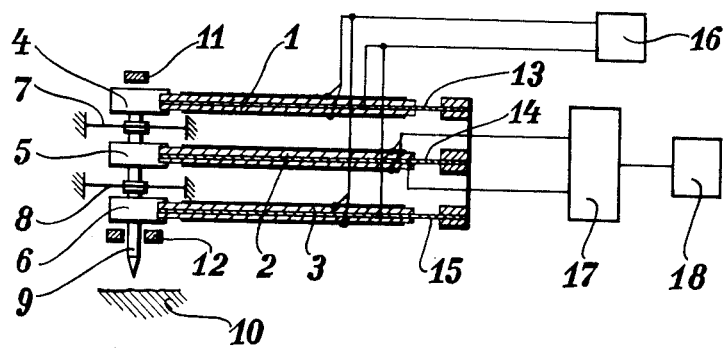
Fig. 1 illustrates the test apparatus with deformable piezoelectric crystals.

In Fig. 1 three piezoelectric crystal preparations are formed and arranged as bending elements 1, 2 and 3, of which the elements 1 and 3 are fed from an oscillator stage 16 which creates the low frequency test oscillations of the testing point or pencil 9, while element 2, yields the test potential which, is led through the amplifier 17 to the measuring equipment 18. Collectively the crystal elements are supported on leaf springs 13, 14 and 15 whose free ends are fixed in spaced relation. Through end pieces 4, 5 and 6 respectively, which are elastically positioned by flat spring discs 7 and 8, the elements 1, 2 and 3 are coupled together. The probing needle 9 is set into the lower end piece 6. Limiting stops 11 and 12 prevent deflections of excess amplitude, which might lead to a rupture of the crystal elements. The test point 9 is led back and forth over the test surface 10 from a motor drive, not shown, with a periodic up and down movement. With irregularities of the surface the test point 9 will be limited more or less in its vertical movement to the test surface which expresses itself in corresponding oscillations in the test values indicated at 18.

Figure 2:
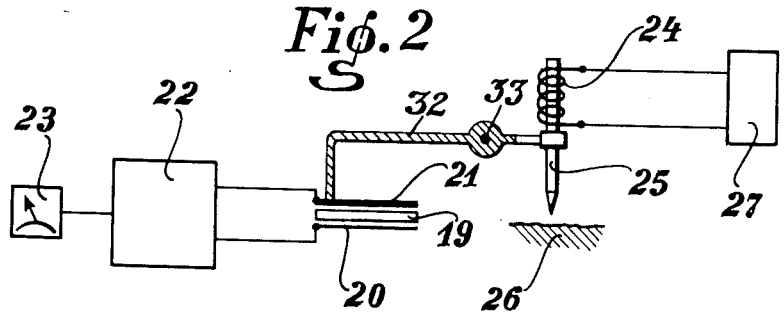
Fig. 2 shows an arrangement with a piezoelectric oscillating quartz.

In Fig. 2 a piezoelectric oscillating crystal 19 with a fixed electrode 20 and a movable electrode 21 is coupled with the test probe 25. The test probe 25 is set into periodic oscillation in an electro-magnetic manner by the solenoid 24 and the oscillator hook-up 27 and in its deflection is limited by the irregularities of the test surface 26. With an ideal surface, the frequency at an amplifying stage 22 oscillates under the control of the oscillating quartz crystal 19 between the free amplitudes as constant appearing maxima and minima which are shifted correspondingly with surface irregularities. An indicator is, for example, possible in which the high frequency measuring oscillating circuit is coupled with an oscillating circuit of similar but somewhat different frequency. In this manner lower frequency heterodynes are obtained whose oscillations are to be brought to the indicator. Accordingly one may so proceed, for example, that the frequency range corresponding to the free range of deviation of the test probe may be damped out through a filter arrangement and with it only the frequency corresponding with the surface irregularities is indicated. At 23 the indicating measuring apparatus is indicated. With capacitative or inductive control of an oscillating circuit the test arrangements are similar.

Figure 3:
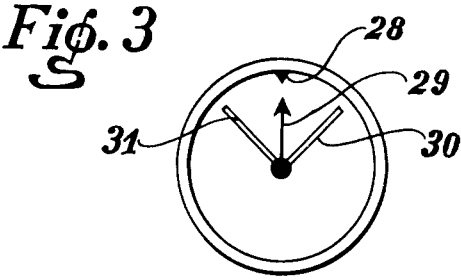
Fig. 3 illustrates a measuring instrument suggested for use in indicating maximum values, and, Fig. 4 is a wiring diagram of a heterodyne amplifying electric circuit forming a part of one embodiment of the invention.

Fig. 3 illustrates an instrument for indicating the maximum surface deviations. A movable scale 28 is provided with a zero point. Opposite the zero point is provided a pointer 29 which in its movements carries two friction or lagging pointers 30 and 31 respectively.

In Fig. 4 is shown a wiring diagram for the heterodyne stage 22. In this circuit the crystal 19 abuts a fixed electrode 20 connected to the grid 35 with a movable electrode 21 connected to an anode 36 of tube 37. The frequency of this oscillating stage determined by the crystal 19 may be varied by the movable electrode 21 within limits which are transmitted by the mechanical vibration of the test probe 25. The frequency modulating vibration of the input frequency stage is combined with the vibration of an oscillator, which consists of crystal 38 and the triode coupling 39, in a converter tube 40. While the high frequency vibration of the converter tube 40 is short circuited through the condenser 41, the modulating vibration causes at the resistance 42 a frequency corresponding with the voltage fluctuation.

The voltage fluctuations at the resistance 42, which are transformed by the rectifier 43 into direct voltage impulses, are transmitted to the condenser 45. The condenser 45 charges a second condenser 47 through a high resistance 46, which second condenser has an essentially greater capacity than the condenser 45.

The condenser 47 is in a grid circuit of a high gradient triode 48 and thereby controls the current directed therethrough to the ammeter 49. The current through the tube 48 is proportional to the variations in voltage at the resistance 42 and is thereby a measure of the movements of the probe 25. Because of the capacity differences of the two condensers 45 and 47 an integration of the total oscillations of the probe 25 therefore results.

An integration of the individual test values can be obtained by means of a condenser, the discharge of which is measured at the conclusion of the test.

Having described our invention, what we claim is:

1. Surface testing apparatus which comprises a testing probe movable over the surface to be tested and supported to oscillate to and from said surface with an inherent frequency, means for oscillating said probe to and from contact with said surface in its inherent frequency, means mechanically coupled to said oscillating means for generating oscillating electric energy from the oscillations of said probe which energy is of varying amplitude according to the surface contacted by said probe, and measuring means connected to said generating means for producing an indication of said amplitude variations.

2. The apparatus of claim 1 in which said probe is supported by a spring, said means for oscillating said probe comprises an oscillating circuit having at least one piezoelectric crystal connected to said probe to actuate said probe oscillations and said means for generating oscillating electric energy comprises a piezoelectric crystal actuated by the movements of said probe.

3. The apparatus of claim 2 in which the probe oscillating circuit comprises a pair of piezoelectric crystals mechanically coupled with the piezoelectric crystal of the generating circuit.

4. The apparatus of claim 3 in which at least one of both types of functionally different crystals is mounted on a leaf spring.

5. The apparatus of claim 4 in which the crystals mounted on the leaf springs are divided into several crystal groups with the single groups in parallel position.

6. The apparatus of claim 1 in which the test probe is spring supported and coupled with a movable branch in which the inherent frequency of a piezoelectric oscillating crystal system directly governs the high frequency circuit and in which the delivered frequency variation is used as a measure for the indicator.

7. The apparatus of claim 1 having an integrating indicating apparatus showing the sum of all individual variations.

8. The apparatus of claim 1 having two lag indicators one on each side of the indicator to indicate the maximum variation.

9. An apparatus for measuring the irregularities of a surface which comprises a test probe, spring means supporting said probe to oscillate to contact with said surface and away from said surface and with an inherent frequency adapted to be drawn across a surface to be tested, a high frequency electric oscillating circuit electrically coupled to said probe to move it to and from contact with said surface periodically in its inherent frequency, a second electric circuit having a generating element actuated by the movement of said test probe to provide electric energy oscillating with an amplitude varying according to the movement of said test probe as it is drawn across the surface, and measuring means connected to said generating element and responsive to said varying amplitude.

10. The apparatus of claim 9 in which said first circuit is coupled through an electromagnetic element to said test probe.

11. The apparatus of claim 9 in which said first electric circuit is coupled through a piezoelectric crystal to said test probe and in which said generating element of said second element is a piezoelectric crystal.

12. Surface testing apparatus which comprises a test probe movable over the surface to be tested, spring supporting means for said probe to enable it to oscillate with an inherent frequency to and from contact with said surface with a fundamental frequency and means comprising an oscillating circuit having at least one piezoelectric crystal connected to said probe to actuate said inherent probe oscillations, means for generating oscillating electric energy from the oscillations of said probe, said means comprising a piezoelectric crystal mechanically coupled to said first mentioned crystal whereby the amplitude of said generated energy varies according to said oscillations and surface irregularities as the probe is moved over said surface, and measuring means including an indicator connected to said generating means and responsive to said amplitude variations.

13. The apparatus of claim 12 having a connecting piece extending in the direction of the oscillation of said crystals in which said test probe is mounted.

14. The apparatus of claim 13 having a measuring oscillating circuit coupled with a second high frequency oscillating circuit of similar but different frequency from that of the measuring frequency and a rectifier between said circuits and the indicator to transmit the amplitude of the frequency of the test probe to the indicator.

15. Surface testing apparatus which comprises a test probe movable over the surface to be tested, parallel spring discs substantially parallel to the surface to be tested and carrying said probe in position normal to said discs and to said surface, an oscillating circuit having at least one piezoelectric crystal connected to said probe to oscillate said probe to and from contact with said surface with a fundamental frequency, a piezoelectric crystal connected to said probe for generating oscillating electric energy from the oscillations of said probe which varies in amplitude according to surface irregularities, and measuring means connected to said last mentioned crystal including an indicator responsive to said amplitude variations.

References Cited in the file of this patent

UNITED STATES PATENTS 302,908    Haight _____ Aug. 5, 1884

(Other references on following page)

UNITED STATES PATENTS

| | | |
|---|---|---|
| 2,283,285 | Pohlman | May 19, 1942 |
| 2,405,133 | Brown | Aug. 6, 1946 |
| 2,460,726 | Arndt, Jr. | Feb. 1, 1949 |

FOREIGN PATENTS

| | | |
|---|---|---|
| 876,949 | France | Aug. 24, 1942 |
| 594,308 | Great Britain | Nov. 7, 1947 |
| 934,238 | France | Jan. 11, 1948 |

OTHER REFERENCES

Methods of Measurement and Definition of Surfaces, by H. Becker, in Microtecnic, vol. 4, No. 6, November-December 1950, pp. 302–307.